(12) United States Patent
Nalezinski et al.

(10) Patent No.: US 7,283,087 B2
(45) Date of Patent: Oct. 16, 2007

(54) RADAR HAVING A TRANSMISSION OSCILLATOR WHICH CAN BE EXCITED QUASI-PHASE COHERENTLY BY AN EVALUATION OSCILLATOR

(75) Inventors: Martin Nalezinski, München (DE); Martin Vossiek, Hildesheim (DE)

(73) Assignee: Siemens Aktiengesellschaft, Munich (DE)

(*) Notice: Subject to any disclaimer, the term of this patent is extended or adjusted under 35 U.S.C. 154(b) by 110 days.

(21) Appl. No.: 10/551,748

(22) PCT Filed: Feb. 16, 2004

(86) PCT No.: PCT/EP2004/001440

§ 371 (c)(1),
(2), (4) Date: Sep. 30, 2005

(87) PCT Pub. No.: WO2004/088353

PCT Pub. Date: Oct. 14, 2004

(65) Prior Publication Data
US 2006/0187112 A1    Aug. 24, 2006

(30) Foreign Application Priority Data
Mar. 31, 2003   (DE) ................. 103 14 558

(51) Int. Cl.
*G01S 13/08* (2006.01)
*G01S 13/00* (2006.01)

(52) U.S. Cl. ...................... 342/128; 342/200

(58) Field of Classification Search ................ 342/128, 342/175
See application file for complete search history.

(56) References Cited

U.S. PATENT DOCUMENTS

| | | | |
|---|---|---|---|
| 640,438 A | | 1/1900 | Blanton |
| 1,968,750 A | * | 7/1934 | Edwards et al. ............. 375/339 |
| 2,951,152 A | * | 8/1960 | Adams et al. ............... 455/273 |
| 2,984,833 A | * | 5/1961 | Nieset et al. ................ 342/134 |
| 3,117,317 A | | 1/1964 | Kenyon |
| 3,329,952 A | * | 7/1967 | Bogle ........................... 342/68 |
| 3,524,186 A | * | 8/1970 | Fleri et al. ................... 342/368 |
| 4,096,445 A | * | 6/1978 | Hopwood et al. ............. 331/17 |
| 4,132,991 A | | 1/1979 | Wocher et al. |
| 4,521,778 A | | 6/1985 | Knepper |
| 5,019,826 A | | 5/1991 | de La Chapelle et al. |
| 5,973,636 A | | 10/1999 | Okubo et al. |
| 6,191,724 B1 | | 2/2001 | McEwan |
| 6,404,381 B1 | | 6/2002 | Heide et al. |

(Continued)

FOREIGN PATENT DOCUMENTS

DE   3819460 A1 * 12/1989

(Continued)

*Primary Examiner*—Thomas H. Tarcza
*Assistant Examiner*—Shelley Chen
(74) *Attorney, Agent, or Firm*—Lawrence A. Greenberg; Werner H. Stemer; Ralph E. Locher (57) ABSTRACT

A radar is provided with transmitting means for transmitting a signal and with receiving means for receiving a reflection of the transmitted signal. The inventive radar is characterized in that the transmitting means is provided with a transmitting oscillator and the receiving means is provided with an evaluation oscillator. The transmitting oscillator is excited by the evaluation oscillator and/or the evaluation oscillator is excited by the transmitting oscillator in a quasi-phase coherent manner.

18 Claims, 8 Drawing Sheets

U.S. PATENT DOCUMENTS

| | | | |
|---|---|---|---|
| 6,777,684 B1 * | 8/2004 | Volkov et al. | 250/341.1 |
| 6,870,503 B2 * | 3/2005 | Mohamadi | 342/372 |
| 6,894,572 B2 * | 5/2005 | Heide et al. | 331/74 |
| 6,963,307 B2 * | 11/2005 | Mohamadi | 343/700 MS |
| 7,119,736 B2 * | 10/2006 | Heide et al. | 342/125 |
| 2004/0108904 A1 * | 6/2004 | Heide et al. | 331/16 |
| 2005/0012653 A1 * | 1/2005 | Heide et al. | 342/42 |
| 2005/0170797 A1 * | 8/2005 | Seisenberger et al. | 455/141 |
| 2006/0187112 A1 * | 8/2006 | Nalezinski et al. | 342/118 |

FOREIGN PATENT DOCUMENTS

| | | |
|---|---|---|
| DE | 100 32 822 A1 | 1/2002 |
| EP | 0 795 761 A2 | 9/1997 |
| EP | 0 795 761 B1 | 9/1997 |
| EP | 1 051 639 B1 | 11/2000 |
| WO | WO99/39220 | 8/1999 |
| WO | WO 203096 A1 * | 1/2002 |
| WO | WO 3040753 A1 * | 5/2003 |
| WO | WO 2004088353 A1 * | 10/2004 |

* cited by examiner

RADAR HAVING A TRANSMISSION OSCILLATOR WHICH CAN BE EXCITED QUASI-PHASE COHERENTLY BY AN EVALUATION OSCILLATOR

BACKGROUND OF THE INVENTION

Field of the Invention

Many forms of radar sensors are known for use in industry and transport. Radar sensors are designed in the form of pulsed radar, as described in U.S. Pat. Nos. 3,117,317, 4,132,991 and 4,521,778, or in the form of so-called continuous wave or CW radars. Pulsed radars determine the distance between an object and the radar by measuring the delay time of a short pulse from the radar to the object and back. In contrast, CW radars evaluate the phase difference between the transmitted signal and the reflected received signal. In order to determine a reliable measurement value in a relatively wide measurement range, the frequencies of CW radars are generally swept over as wide a frequency range as possible. The best known and most widely used radar of this type is the FMCW radar (FMCW=frequency modulated continuous wave).

SUMMARY OF THE INVENTION

Particularly in free-space applications, it is desirable to be able to reduce the transmission power of a radar sensor deliberately, since the radio licensing regulations frequently require that the emitted transmission power and, in particular, the interference transmissions associated with the transmission process, remain below a specific level.

EP 1 051 639 B1 proposes a pulsed FMCW radar which is distinguished in that the radio-frequency output power of the radar can be influenced by the choice of a pulse sequence with which the transmission signal is clocked.

Figure 1:
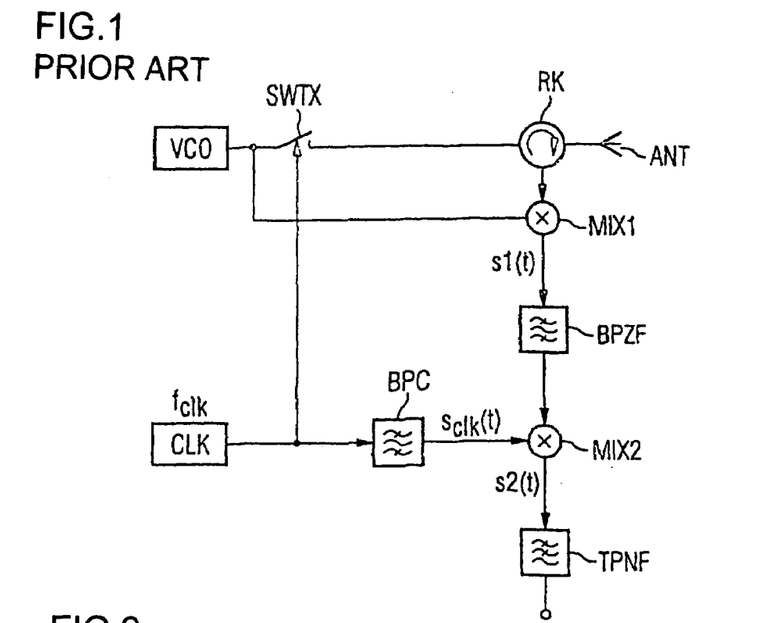
FIG. 1 shows a radar according to the prior art.

FIG. 1 illustrates a circuit variant according to the prior art as an improvement to the radar disclosed in EP 1 051 639 B1. The radar illustrated here has, like a conventional FMCW radar, a voltage controlled oscillator VCO, a directional coupler RK, an antenna ANT and a mixer MIX1. In the same way as described in EP 1 051 639 B1, the radar also has clock logic CLK, by means of which the transmission signal is switched on and off periodically via a switch SWTX. For example, if the switch is closed at a repetition rate of 1 MHz for only 1 ns in each case, then the mean transmission power is decreased by 60 dB in comparison to continuous operation. Any other desired values can also be set within a wide range by variation of the duty ratio.

Figure 6:
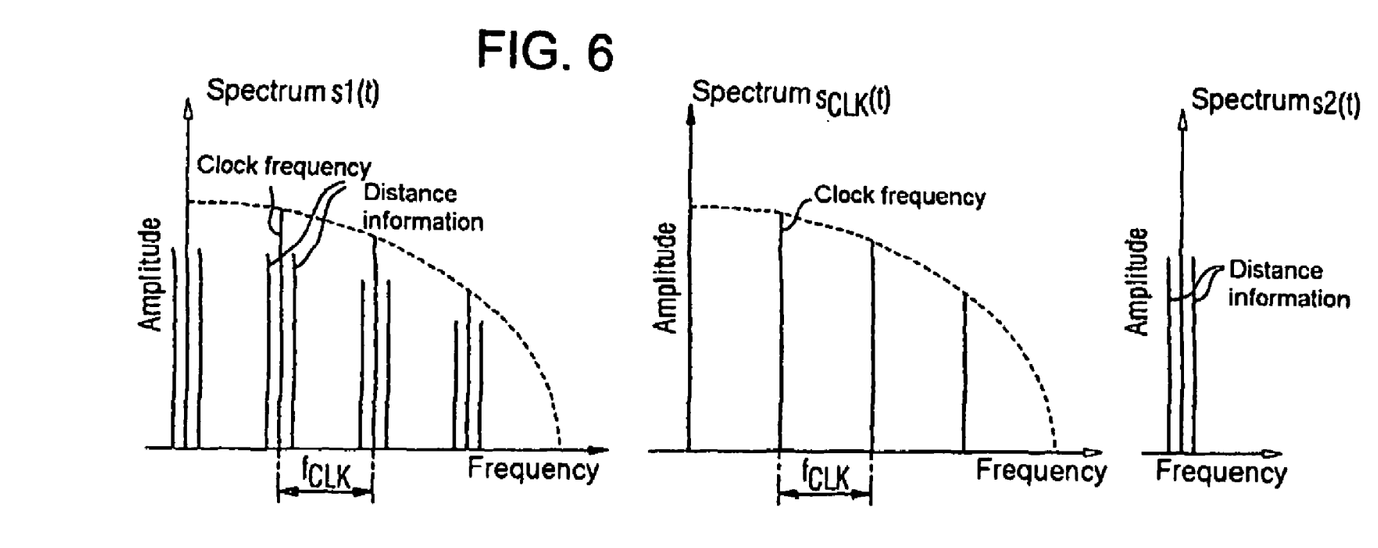
FIG. 6 shows a spectra of a measurement signal at various stages in the measurement signal path.

The circuit variant also has a second mixer MIX2. The signal received via the antenna ANT is keyed or amplitude-modulated by the clock logic CLK located in the transmission path, and has the spectrum illustrated (on the left) in FIG. 6. This modulation is precisely counteractive by mixing the received signal with $s_{CLK}(t)$ in MIX 2, and the measurement signal $s1(t)$ is converted to the signal $s2(t)$ in baseband that is to say in the frequency range around the frequency 0.

A measurement signal as in the case of conventional FMCW radars which are operated without being pulsed is thus produced after filtering by means of the low-pass filter TPNF, which suppresses higher mixing products.

A concept as illustrated in FIG. 1 has the advantage that the clock rate of the clock logic CLK can be varied over wide ranges. The width of the variation range is limited only by the bandwidth of BPZF and BPC. The magnitude of the mean transmission power can thus also be varied over a wide range without changing the form or frequency of the measurement signal. All that is changed is the signal-to-noise ratio of the measurement signal.

The embodiment shown in FIG. 1 has the disadvantage that the switch SWTX must in this case be a radio-frequency switch.

On the one hand, radio-frequency switches are very complex, and on the other hand high switching contrast can be achieved only with difficulty. In consequence, the power can in practice often be reduced only to a restricted extent by means of the circuit shown in FIG. 1.

Figure 2:
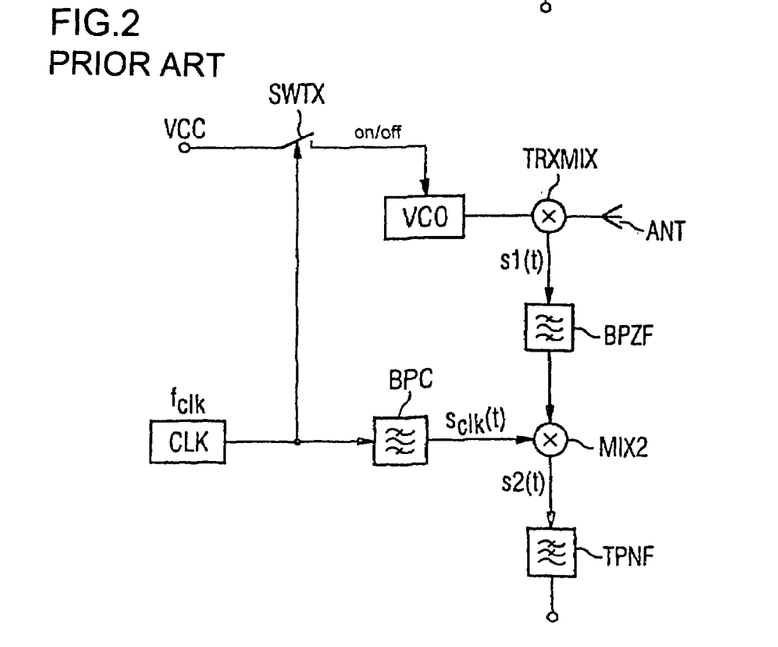
FIG. 2 shows a second radar according to the prior art.

A variant according to the prior art whose circuitry complexity is considerably simplified and which solves the problem is shown in FIG. 2. In this case, the switch SWTX switches the oscillator itself on and off. This can be achieved, for example, by connection and disconnection of the supply voltage. If the oscillator is not oscillating, it does not produce any signal power, and the switching contrast is a maximum. Furthermore, a so-called transmission mixer TRMIX is used instead of the directional coupler, in order to simplify the circuit.

However, the circuit shown in FIG. 2 has the disadvantage that either the maximum measurement range or the minimum mean transmitted power or the minimum measurement rate of the radar is restricted by this type of switching. This is because, on the one hand, the switch SWTX must in this case always remain closed until all of the signal components, that is to say even those from the maximum distance to be expected or from the maximum predetermined distance, have been received again. The pulse duration, that is to say the time during which the switch is closed and the oscillator is switched on should thus be considerably longer than the maximum signal delay time. With a measurement range of, for example, 15 m, the maximum signal delay time would be expected to be 70 ns, so that in this case sensible measurement values would be expected only with pulse durations of more than 100 ns. In order on the other hand to achieve a desired reduction in the mean power by means of the duty ratio, correspondingly long pauses must be ensured between the switching-on moments, and in some cases these contradict the sampling theorems. This is because each period for which the radar is switched on corresponds to the production of one sample value, which corresponds to the sampling of the measurement signal of a continuously operated FMCW radar. It is thus impossible to evaluate high frequencies if the pauses are too long. The distance to a measurement object, to which the measurement signal frequency is proportional, must therefore not exceed a specific distance at a predetermined sweep rate of the frequency ramp. If the measurement range is nevertheless increased beyond this level, the sweep rate must be reduced, and the measurement time for a measurement must therefore be increased.

One object of the present invention is to describe the systems which achieve the object of the described apparatuses in a different and improved form and whose transmission and operating behavior can, furthermore, be controlled particularly advantageously.

This object is achieved by the invention specified in the independent claims. Advantageous refinements are specified in the dependent claims.

An arrangement or apparatus accordingly has transmission means for production and transmission of an electromagnetic signal, and reception means for reception of a reflection of a transmitted electromagnetic signal. In this case, the transmission means have a transmission oscillator for production of the electromagnetic signal, and the reception means have an evaluation oscillator for production of an electromagnetic valuation signal which can be compared, in particular mixed, with the received reflection of the transmitted electromagnetic signal. The transmission oscillator and the evaluation oscillator are in this case connected and/or arranged such that the transmission oscillator can be excited quasi-phase coherently and/or is coupled quasi-phase coherently to the oscillating evaluation oscillator by electromagnetic interaction.

In consequence, the transmission oscillator need be switched on only when required, thus reducing the energy consumption and the mean transmission power, as desired. On the other hand, however, the quasi-phase coherent excitation or coupling always ensures sufficient phase coherence between the transmission oscillator and the evaluation oscillator, and the electromagnetic signal which is generated by the transmission oscillator, as well as between its reflection and the evaluation signal which is generated by the evaluation oscillator.

Alternatively or additionally, the evaluation oscillator can also be excited quasi-phase coherently by the transmission oscillator for other purposes.

In this case, quasi-phase coherently means that the arrangements according to the invention ensure that the phase difference between the signals from the transmission oscillator and the evaluation oscillator is small, but not necessarily negligible, as in the case of pure coherence. The expression small phase difference should in this case be considered with respect to the intended communication or measurement task. By way of example, the value $\pi/10$, that is to say approximately 20°, is frequently used as the limit for a small phase error. Signals such as these with only small phase errors are referred to in the following text as being quasi-phase coherent, and the time interval in which this coherence exists is referred to as the coherence time period.

One fundamental idea for implementation of quasi-phase coherence is described in DE 100 32 822 A1 and comprises an oscillator initially being in unstable equilibrium after being switched on, and first of all having to be caused to oscillate by some sort of external power supply. An oscillation starts, via the feedback, only after this initial stimulus. This initial stimulus is normally provided, for example, by thermal noise. This means that an oscillator starts to oscillate with a random phase and amplitude, at the frequency which is predetermined by its resonant circuit. However, if an external excitation signal is injected into the oscillator when it is switched on, then the oscillator does not start to oscillate randomly, but deterministically with respect to the phase of the injected signal. As long as the phase difference between the injected signal and the oscillator signal is less than about 20°, the two signals are quasi-phase coherent.

The characteristic of an oscillator attempting to follow the phase profile of a stimulating signal in the switching-on phase is a fundamental physical characteristic of any oscillator, which characteristic is, however, used according to the invention to couple two oscillators to one another quasi-coherently and to operate the transmission oscillator quasi-coherently with respect to the evaluation oscillator, or else, alternatively, to operate the evaluation oscillator quasi-coherently with respect to the transmission oscillator.

For the quasi-phase coherent excitation capability, the oscillators are electromagnetically coupled to one another in such a way that the transmission oscillator can be excited quasi-phase coherently by the evaluation oscillator, and/or the evaluation oscillator can be excited quasi-phase coherently by the transmission oscillator. This can be achieved by the oscillators being connected to one another by line means.

On the other hand, the crosstalk from one oscillator to the other is generally sufficient, provided that the oscillators are arranged close to one another and, in particular, are not shielded from one another.

The oscillator which can be excited quasi-phase coherently is preferably repeatedly brought to the state in which it can be excited quasi-phase coherently by being switched off and on again repeatedly at a clock rate by means for cyclic switching of the oscillator which can be excited quasi-phase coherently. In general, the pulse sequence should be chosen such that the time for which the oscillator which can be excited quasi-phase coherently is switched on is shorter than or equal to the time period in which the quasi-phase coherence exists between the oscillator which can be excited quasi-phase coherently and the oscillator which provides the quasi-phase coherent excitation. The clock repetition rate at which the oscillator which can be excited quasi-phase coherently is switched is, in particular, considerably higher than the maximum measurement signal frequency to be expected, in particular more than five times as high.

The time for which the oscillator which can be excited quasi-phase coherently is switched on is in this case in the same order of magnitude as the reciprocal, or is less than the reciprocal, of the maximum difference to be expected between the frequencies of the two oscillators, which are coupled quasi-phase coherently, in the steady state.

The frequencies of the transmission oscillator and/or of the evaluation oscillator are variable. The arrangements can then be operated as a frequency-modulated pulse radar or as a pulsed FMCW radar.

One variant, which is very particularly suitable for short range, is obtained by the frequency of one oscillator being variable, while the other oscillator is in each case a fixed-frequency oscillator.

The arrangement is, in particular, an arrangement for distance measurement and/or a radar, in particular a radar which can be swept through a frequency range and/or a radar which can be switched to two switching states between a short-range radar and a long-range radar.

In a measurement method, in particular for distance measurement, a transmission oscillator is excited quasi-phase coherently by an evaluation oscillator and/or an evaluation oscillator is excited quasi-phase coherently by a transmission oscillator, a signal to be transmitted is produced by a transmission oscillator, the signal is transmitted, a reflection of the transmitted signal is received, and an evaluation signal is produced by the evaluation oscillator.

The reflection of the transmitted signal is then evaluated in the measurement process, in particular taking into account the evaluation signal. The evaluation signal is in this case preferably mixed with the reflection of the transmitted signal.

It is furthermore preferable for the transmission oscillator to be excited quasi-phase coherently repeatedly and cyclically by the evaluation oscillator, and/or the evaluation oscillator is excited quasi-phase coherently, repeatedly and cyclically by the transmission oscillator, for which purpose the oscillator which is excited quasi-phase coherently is switched off, and is switched such that it can be excited quasi-phase coherently again, at a clock rate, for example by switching it off and on.

Other advantageous refinements of the method result analogously to the advantageous refinements of the arrangement.

Further advantages and features of the invention are explained in the description of exemplary embodiments. In the figures:

DESCRIPTION OF THE PREFERRED EMBODIMENTS

Figure 3:
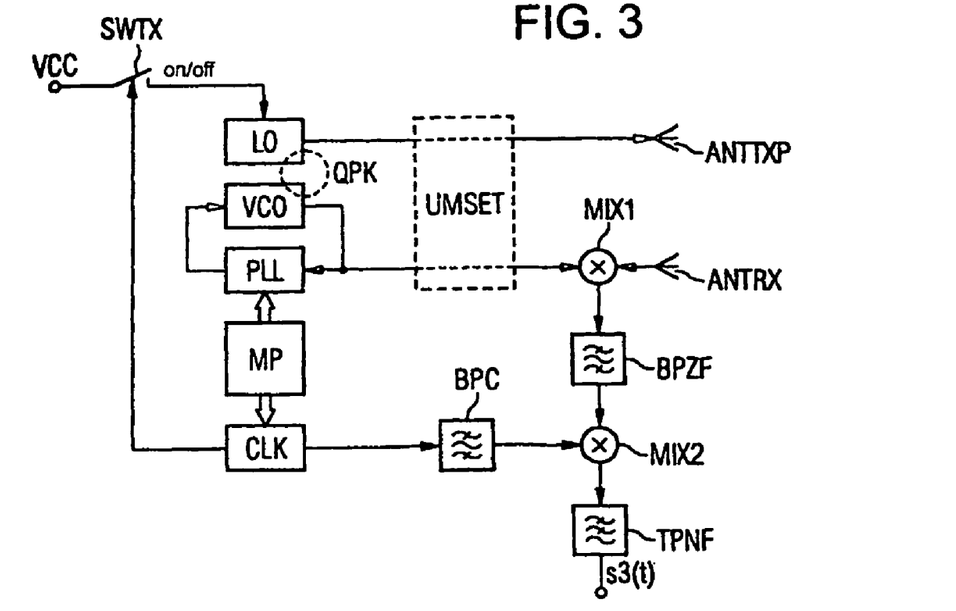
FIG. 3 shows an arrangement with transmission means and reception means.

The problems relating to FIG. 2 are solved by the circuit shown in FIG. 3. In addition to the oscillator VCO, which is now used as the evaluation oscillator, the circuit contains a further oscillator, the transmission oscillator, LO, which is used to produce the transmission signal. The critical factor is that the evaluation oscillator VCO and the transmission oscillator LO are coupled to one another in a quasi-phase-locked manner or quasi-phase coherently via the coupling QPK. If the transmission oscillator LO is switched on cyclically while the signal from the VCO is coupled to it, then the transmission oscillator LO repeatedly starts to oscillate with a phase which is predetermined by the evaluation oscillator VCO.

A loose connecting line which is coupled to both oscillators may be provided in order to ensure this coupling QPK. However, because oscillator power is always being emitted, there is generally no need to provide specific circuitry apparatuses in order to couple the oscillators to one another, provided that the oscillators are not shielded from one another, that is to say, for example, they are each designed without their own electrically closed metallic cover. Crosstalk from the evaluation oscillator VCO to the transmission oscillator LO naturally likewise takes place via the ground or supply lines. No specific requirements need be observed in the choice of the oscillators, either. Conventional radio-frequency oscillators may be used, although one of the two oscillators must, according to the invention, be switched off and on cyclically by a suitable pulse sequence in order in this way, as described, to ensure quasi-phase coherent coupling of the two oscillators. Care should preferably be taken to ensure that there is no third significantly stronger signal acting on the switched transmission oscillator LO from the outside and that this oscillator does not start to oscillate coherently in response to this third signal instead of that from the evaluation oscillator VCO.

If the frequencies of the oscillators LO and VCO are the same, then s3(t) becomes DC voltage which represents the difference phase (which by definition is small) between the two quasi-coherent output signals. If the transmission oscillator LO is in each case switched on cyclically for only a very short time, the quasi-phase coherence is maintained between the two oscillators over all of the periods in which they are switched on. This means that the signal s3(t) of the mixer MIX2 is virtually identical to the signal which would result if the signal from the oscillator were keyed by a switch at the same clock rate.

Figure 13:
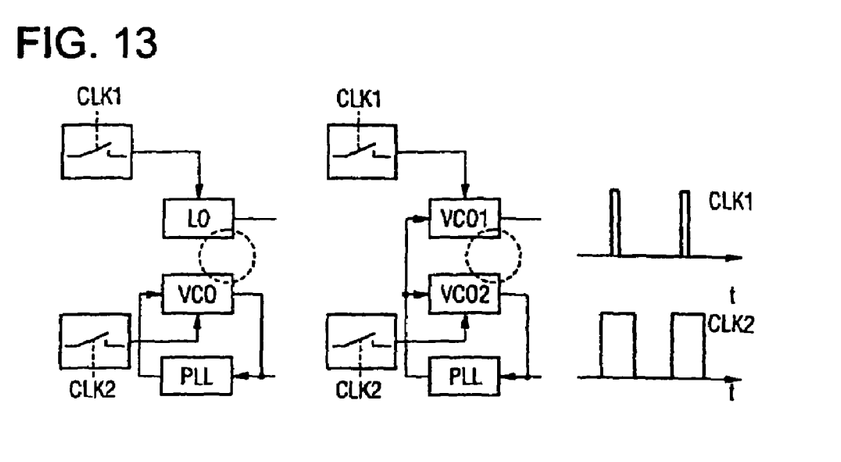
FIG. 13 shows variants of the coupled signal sources.

As is illustrated in FIG. 13, the evaluation oscillator VCO may also additionally be switched, in addition to the transmission oscillator LO. In this case, its stabilization must be largely complete at the moment at which the transmission oscillator LO is switched on, and it must not be switched off again until the reflections have arrived from the maximum range area detected by the sensor. The switching of the evaluation oscillator VCO does not change the phase conditions between the transmitted signal and the received signal with respect to a measurement with the evaluation oscillator VCO switched on all the time. However, this operating mode is advantageous for energy consumption reasons. In the arrangement shown in FIG. 3, it is not relevant that the transmitting antenna ANTTXP and the receiving antenna ANTRX are formed separately. A single transmitting/receiving antenna could likewise be fed via a directional coupler or circulator. The use of a PLL synthesizer or a PLL for controlling the VCO (PLL=Phase locked loop) is not critical either. All that is indicated here is the capability to completely control the sensor by means of a microprocessor MP.

If the oscillator LO is a fixed-frequency oscillator and the VCO is a fixed-frequency oscillator, this results on the one hand in a constant frequency offset and a sin(x)/x amplitude weighting of the measurement signal s3(t). However, both effects can be taken into account in the measurement signal evaluation process quite easily by calculation.

Figure 4:
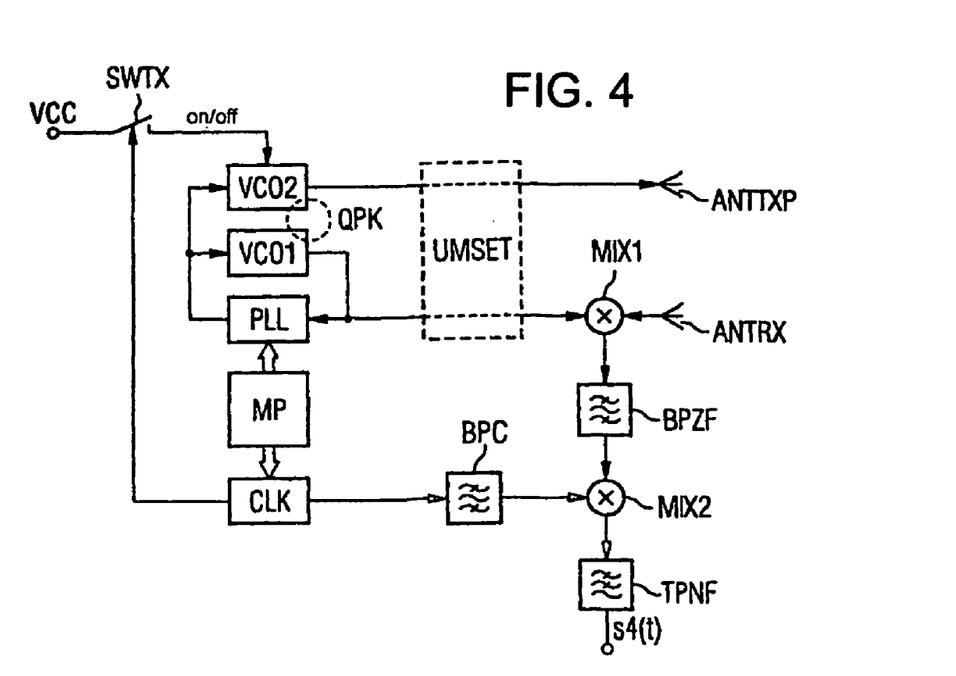
FIG. 4 shows an alternative arrangement with transmission means and reception means.

The circuit shown in FIG. 4 produces the same measurement signals as the circuit shown in FIG. 1. In this case, the variable-frequency transmission oscillator VCO2 is designed to be as identical as possible to the variable-frequency evaluation oscillator VCO1, and the two control inputs of the oscillators are connected to one another. In the same way, as in FIG. 3, the transmission oscillator VCO1 and the evaluation oscillator VCO2 are coupled to one another via quasi-phase-locked or quasi-phase coherent coupling QPK.

If the transmission oscillator VCO1 and the evaluation oscillator VCO2 are of the same type, then the frequencies of the two oscillators VCO2 and VCO1 match virtually precisely over the entire frequency sweep range, that is to say at any switching-on time. Since both oscillators now oscillate quasi-coherently at the same frequency over the entire frequency sweep range, this results in a signal s4(t) as in the case of a continuously operated FMCW radar, with only the signal-to-noise ratio being reduced.

In this case as well, it is once again possible as shown in FIG. 13 for the evaluation oscillator likewise to be designed to be switchable so that the sensor consumes less energy.

A suitable configuration could appear as follows: the mid-frequency of the oscillators could, for example, be in the vicinity of 6 GHz or 26 GHz. By way of example, the oscillator VCO1 is tuned in a bandwidth of about 1 GHz (or even more) within 1-10 ms. The CLK clock rate can then, for example, preferably be in the range from 1 to 10 MHz. The pulse duration is then preferably in the range from 100 ps to 10 ns.

Figure 12:
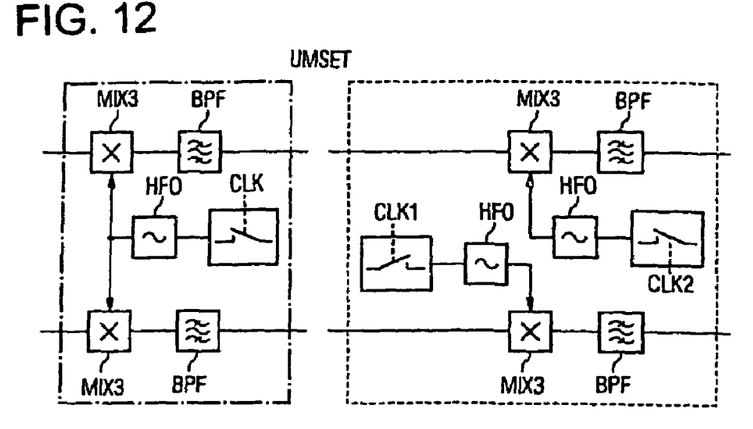
FIG. 12 shows embodiments of a converter.

Furthermore, the operation of the sensor according to the invention as shown in FIG. 3 or 4 is maintained when, as shown by dashed lines, a frequency converter UMSET with embodiments as shown in FIG. 12 is inserted in the sensor. As illustrated on the left in FIG. 12, the converter has a fixed-frequency oscillator HFO, one mixer in each case and, possibly, a bandpass filter in the transmission path and reception path. The bandpass filter may be required in order to suppress undesirable mixing products, for licensing reasons. The fixed-frequency oscillator HFO may once again be designed to be switchable for energy reasons, in which case the oscillator must have largely stabilized when the oscillators LO and VCO1 are switched on, and must not be switched off until the reflections have arrived at the sensor from the maximum range area to be detected. Alternatively, as is illustrated on the right in FIG. 12, the implementation may have two separate oscillators HFO1 and HFO2 which are coupled quasi-coherently to one another. In this case, the switching-on time can once again be optimized for coherence and energy consumption purposes.

Figure 5:
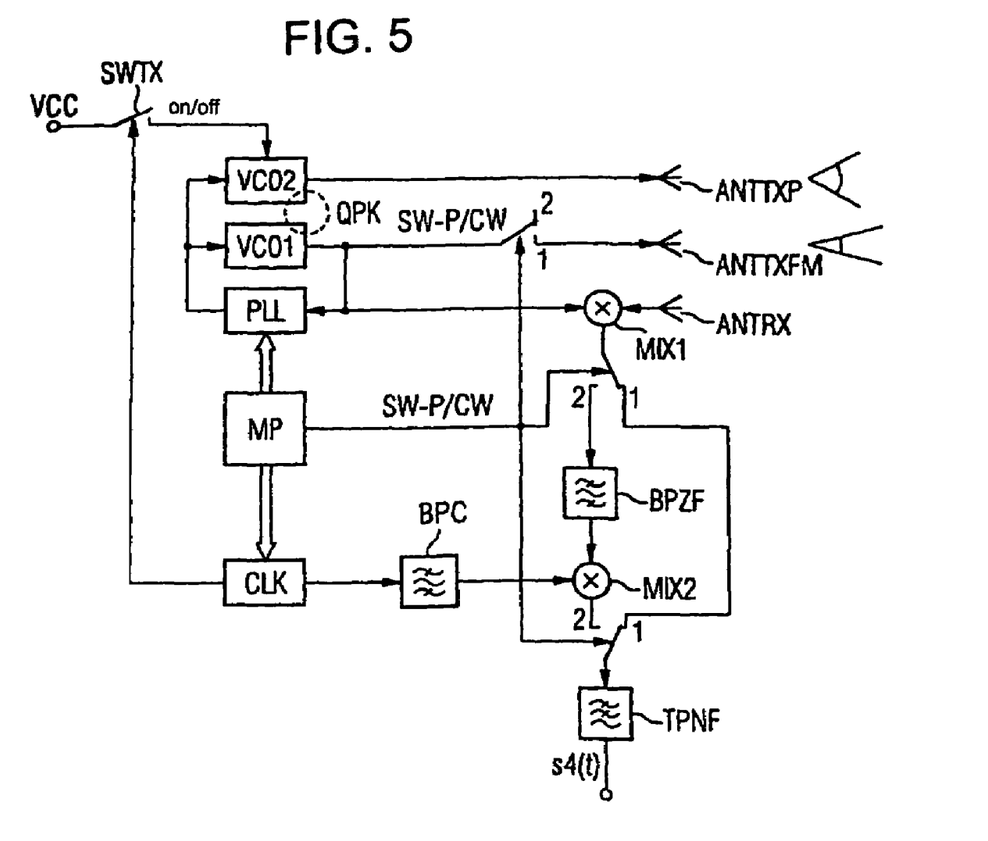
FIG. 5 shows a further arrangement with transmission means and reception means.

A more advanced refinement of the circuit in the form of a multifunction radar is shown in FIG. 5. By way of example, a switching signal SW-P/CW from the microprocessor MP can in this case be used to switch the radar to two operating states. In the switching state 1, the radar operates as a conventional FMCW radar with full output power and, accordingly, a long range and high sensitivity. In this operating mode, the microprocessor control system is used to ensure that: a) the switch SWTX is open, that is to say the oscillator VCO2 does not produce a signal, and b) that the oscillator VCO1 produces only signals in the frequency range which comply with the licensing regulations, that is to say by way of example according to FCC 15 in the ISM band from 24 GHz to 24.25 GHz with an emitted field strength of <250 mV/m.

In the switching state 2, the sensor operates as an ultra wideband pulsed FM radar in accordance with the extended licensing regulations in FCC part 15 "Ultra-Wideband Transmission System". Different antennas are also preferably used for the different operating modes. In the exemplary embodiment, the antenna ANTTXP has a considerably wider beam angle than the antenna ANTTXFM. This is worthwhile because, in the operating mode 2, this system is preferably suitable for use as a short-range radar while, in the switching state 1, it is preferably used to cover longer ranges. The antenna ANTRX may also be designed to be switchable between these two directionalities or, for the sake of simplicity, may be designed in the same way as the antenna with the larger beam angle (that is to say in the same way as ANTTXP). The antennas may be separate, joint or switchable, and array elements may be connected or disconnected in antenna arrays. Those skilled in the art will normally be familiar with the ways in which such antenna solutions and switches are implemented, and this is therefore not the subject matter of the statements here.

The radar as shown in FIG. 5 is ideally suitable for use as a motor vehicle radar. It covers the short-range area in the operating mode 2, for example for use as a parking aid. In the operating mode 1, the radar sensor can carry out measurements at significantly longer distances, for example up to typically 100 m, admittedly with poorer resolution, and can thus be used well for the purpose of speed control and collision avoidance (for example as so-called Stop and Go Radar). The switching between the operating modes could, for example, be coupled to the gear selection; reverse and first gear result in the operating mode 2, and all the other gears in the operating mode 1. Coupling to the vehicle speed or continuously varying operation would also likewise be feasible.

All the described radar are, of course, not limited to specific applications but may be used in all fields where pulsed or CW radars would also otherwise be used.

A method for operation of the sensor as shown in FIG. 3 and the method for evaluation of its measurement signals will now be described in the following text. The signals from the other arrangements can be described as in the text above or can be evaluated in the conventional way for normal radar sensors. However, in the case of the radar sensors shown in FIG. 3, there are a number of special features which result in particularly advantageous capabilities.

FIG. 7 once again shows the basic sign of the sensor and the designations of the signals.

Figure 7:
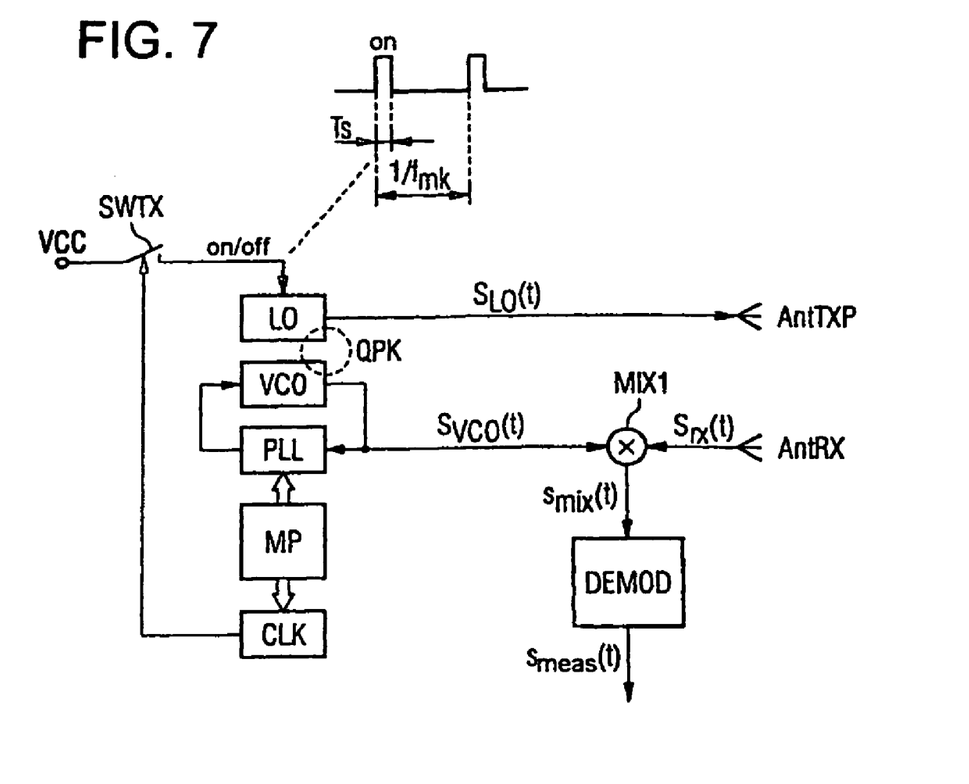
FIG. 7 shows yet another arrangement with transmission means and reception means.

The function of the advantageous method for range measurement can be derived as follows: first of all, a single-frequency signal in the form $$s_{VCO}(t)=\sin((\omega_{sw})\cdot t+\phi_0)$$

is assumed as the signal from the oscillator VCO $s_{VCO}(t)$, where $\omega_c$ is the mid-frequency, $\omega_{sw}$ is an initially fixed modulation frequency, t is the time and $\phi_0$ is an undefined phase offset. As described above, the transmission oscillator LO is switched on and off cyclically. The frequency at which the oscillator LO is switched on and off is referred to in the following text as $f_{mk}$, and the time period for which the oscillator is in each case switched on is Ts.

During each switching-on process, the oscillator LO in the preferred arrangement starts to oscillate exactly with the instantaneous phase of $s_{VCO}(t)$, at its own natural oscillation frequency $\omega_{LO}$. If, by way of example, the oscillator is switched on at the time $t=-\tau$, then it starts to oscillate with the phase $$\phi_1=\arg\{s_{VCO}(-\tau)\}=(\omega_c+\omega_{sw})\cdot(-\tau)+\phi_0$$

and, in consequence, the oscillator signal $s_{LO}(t)$ corresponds to:

$$s_{LO}(t)=\sin(\omega_{LO}\cdot t-(\omega_c+\omega_{sw})\cdot\tau+\phi_0).$$

This signal is transmitted from the radar to the respective reflector, is reflected on the latter and arrives at the radar delayed by the delay time $\tau$, where $\tau=2*\text{dist}/c$, with dist being the distance between the radar and the reflector and c being the speed of light, as the received signal $s_{rx}(t)=s_{LO}(t-\tau)$.

$$s_{rx}(t)=s_{LO}(t-\tau)=\sin(\omega_{LO}\cdot(t-\tau)-(\omega_c+\omega_{sw})\cdot\tau+\phi_0$$

This received signal $s_{rx}(t)$ is mixed with the instantaneous VCO signal $s_{VCO}(t)$ in the mixer. If the high-frequency mixing products are ignored and, for simplicity, it is assumed that $\omega_{LO}=\omega_c$ as is possible without any restrictions to generality if $\omega_{sw}$ is chosen appropriately, then the mixed signal $s_{mix}(t)$ becomes:

$$s_{mix}(t)=\cos(t\cdot\omega_{sw}+\tau\cdot(\omega_c+\omega_{sw})).$$

The following text is now based on the assumption that electronic components/means DEMOD are provided downstream from the receiving mixer MIX1 and leads to the elimination of the changeover time in the voltage in the time interval between switching on and switching off, that is to say from 0 . . . Ts, in the sense of averaging. A simple envelope curve demodulator according to the prior art, in which the signal is detected and is then low-pass filtered would, for example, operate in this sense.

Figure 8:
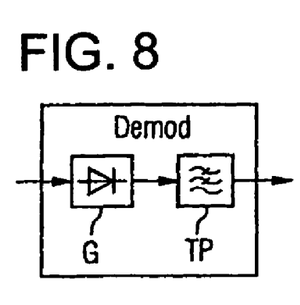
FIG. 8 shows a demodulator.

FIG. 8 shows one embodiment of a simple demodulator DEMOD such as this with a detector GR and the low-pass filter TP.

Figure 9:
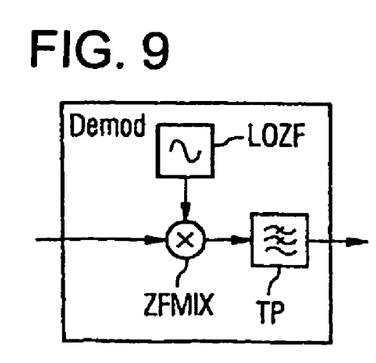
FIG. 9 shows an alternative demodulator.

One more advantageous variant of a demodulator DEMOD, as is sketched in FIG. 9, comprises the mixed signal preferably being down-mixed with a frequency in the vicinity of or (as is illustrated in FIG. 1) equal to the cyclic frequency $f_{mk}$ of the clock control CLK/Sw to a low frequency, and then being filtered by means of a filter TP which has at least one low-pass response. One possible embodiment of this variant has a local oscillator LOZF, a mixer ZFMIX and a low-pass filter TP. In principle, the entire system now corresponds to the circuit shown in FIG. 3. If the frequency of the local oscillator LOZF is defined such that negative mixed frequencies can occur, then the mixer ZFMIX must be designed as a complex-value mixer, that is to say an IQ mixer according to the prior art (IQ: In Phase and Quadrature phase, that is to say 90° phase-shifted). It is also possible, for example, to use a bandpass filter instead of the low-pass filter TP.

Considered in the time interval 0 to TS, the described means effectively result in the determination of the root mean square value of the voltage of the mixed signal $s_{mix}(t)$. This root mean square value from then on forms the actual measurement signal $s_{meas}(t)$. Constant amplitude factors are ignored in the following description. The root mean square value of $s_{mix}(t)$ in the time interval 0 to TS, that is to say $s_{meas}(t)$, is calculated as follows:

$$s_{meas}(t) = \int_0^{T_s} s_{mix}(t) = const. \cdot \frac{\cos\left(\omega_c \cdot \tau + \omega_{sw} \cdot \tau + \frac{1}{2} \cdot T_s \cdot \omega_{sw}\right) \cdot \sin\left(\frac{1}{2} T_s \cdot \omega_{sw}\right)}{\omega_{sw}}.$$

Since the measurement system is preferably operated in a frequency-modulated form, the following text considers the situation in which the modulation frequency $\omega_{sw}$ is modulated as a function of time. If $\omega_{sw}$ is swept linearly from $-B/2$ to $+B/2$ over the bandwidth B during a time period T, that is to say:

$$\omega_{sw} = \frac{2 \cdot \pi \cdot B \cdot t}{T}$$

then, from $s_{meas}(t)$ for the resultant FMCW measurement signal $s_{measfmcw}(t)$:

$$s_{measfmcw}(t) = \cos\left(\omega_c \cdot \tau + \frac{2 \cdot \pi \cdot B \cdot t \cdot \tau}{T} + \frac{\pi \cdot B \cdot t \cdot T_s}{T}\right) \cdot \frac{\sin\left(\frac{\pi \cdot B \cdot t \cdot T_s}{T}\right)}{\left(\frac{\pi \cdot B \cdot t}{T}\right)}.$$

As has already been described, the signal is reproduced exactly only during a switched-on period in the derivation with the signal $s_{measfmcw}(t)$. Since this signal is additionally modulated by the periodic modulation in the transponder, this results in a frequency shift of $s_{measfmcw}(t)$ by $f_{mk}$ and additional higher-order spectral components, as has already been indicated in FIG. 6. Since this amplitude modulation effect is generally known, only a single spectral component will be considered by way of example in the following text, or the signal $s_{measfmcw}(t)$, first of all as if it were not cyclically modulated.

This measurement signal $s_{measfmcw}(t)$ now has two critical and highly advantageous differences in comparison to signals from standard FMCW radars.

On the one hand, the measurement signal $f_{meas}$, which corresponds to the derivative of the phase of the cos argument, that is to say $$f_{meas} = dist \cdot \frac{2 \cdot B}{T \cdot c} + \frac{B \cdot T_s}{2 \cdot T} = f_{beat} + \Delta b,$$

is shifted by the frequency component $\Delta b = B \cdot T_s/(2\,T)$. The frequency $f_{beat}$ corresponds to the normal FMCW measurement frequency and includes the actual measurement information, specifically the distance between the radar and the reflector, where $\tau = 2$ dist/c. On the other hand, the signal $s_{measfmcw}(t)$ is amplitude-weighted with a trigonometric function, in particular an Si function (Si(x)=sin(x)/x). The Fourier transform, that is to say the spectrum of this amplitude-weighted signal, results in a square-wave function, with the width $\Delta p$ of the square wave being:

$$\Delta p = \frac{B \cdot T_s}{T}$$

Since the mid-frequency $f_{meas}$ of the square wave occurs at $f_{beat} + \Delta b = f_{beat} + 0.5 \cdot \Delta p$ as a result of the described frequency shift, this results in the advantageous characteristic that that spectral component of the cos function which is located in the positive frequency range and in the negative frequency range does not overlap even when the range becomes negligibly small. This means that a radar system according to this invention can be used to measure ranges down to 0, in principle independently of the bandwidth. In consequence, this system does not have the short-range problem of comparable known radars with real-evaluation, whose basic spectrum is illustrated in FIG. 10.

Figure 10:
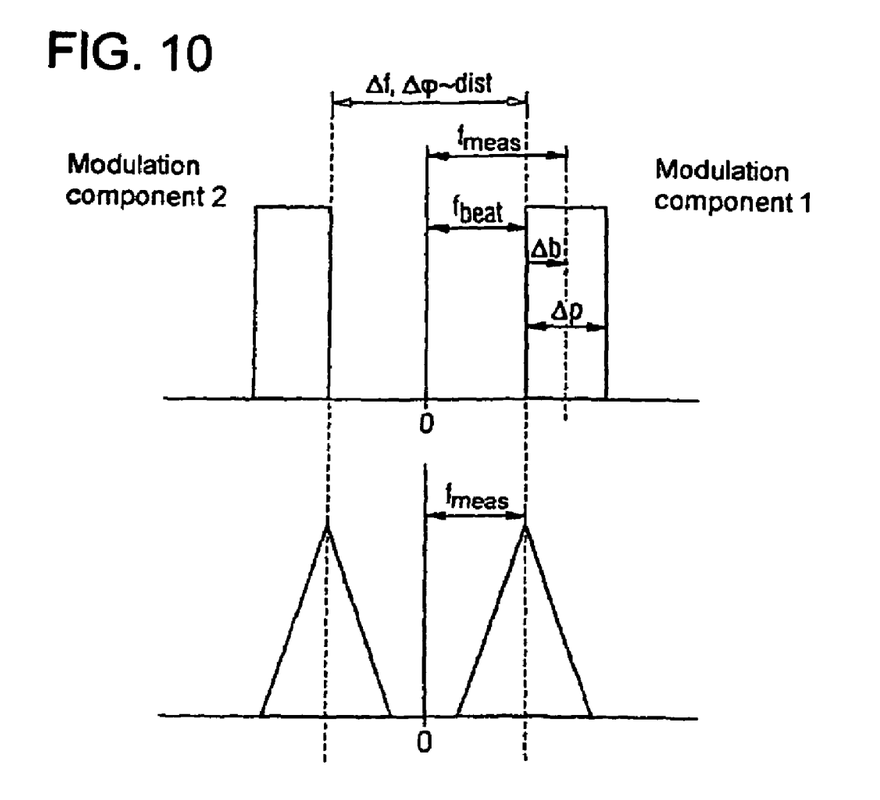
FIG. 10 shows schematic measurement spectra of the arrangement as shown in FIG. 7 and of a conventional rangefinding radar by comparison.

This advantageous characteristic is assisted by the fact that the spectral envelope curve is a square-wave function, as illustrated at the top in FIG. 10. In consequence, the beat frequency $f_{beat}$ and thus the distance can be determined on the basis of the interval between the outer edges of the right-hand and left-hand sidebands.

FIG. 10 is intended for general illustrative purposes and represents the frequency spectrum for the echo signals which are received by the radar as measurement signals (echo signals). The envelope curve of all the amplitudes â of the echo signals over the entire frequency range or else over only a section of it is referred to as the echo profile, which has to be evaluated. Amplitudes â, phases φ and frequencies f of the echo signals are thus measured and are processed further in a computation unit.

The system is preferably configured as follows: the switched-on duration Ts is preferably chosen such that it corresponds to half the reciprocal of the modulation bandwidth B, that is to say Ts=2/B. The modulation frequency $f_{mk}$ is chosen on the basis of the desired effective transmission path. One suitable practical configuration could appear as follows:

B=1 GHz, Ts=2 ns and $f_{mk}$=2 MHz.

Figure 11:
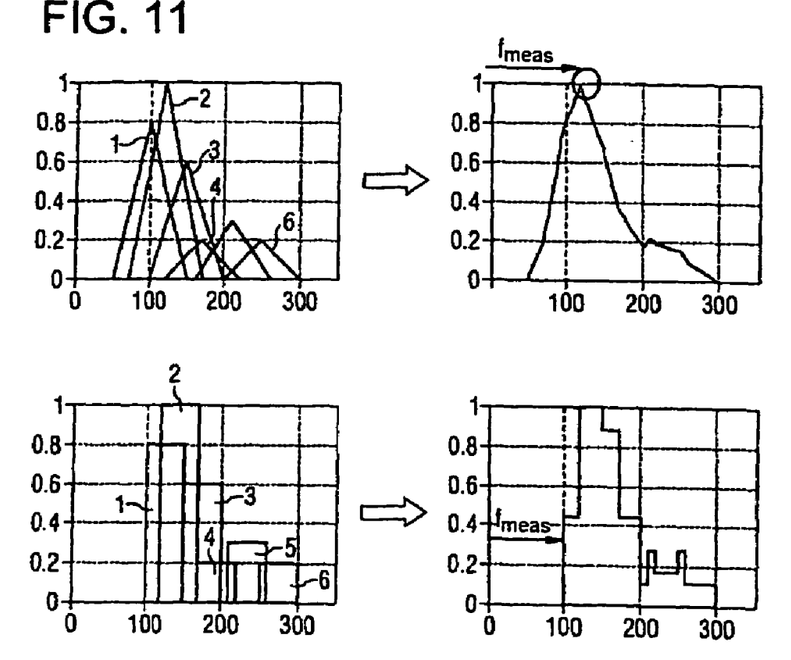
FIG. 11 shows measurement results for the arrangement shown in FIG. 7, and for a conventional rangefinding radar by comparison.

It is particularly advantageous for the system according to the invention to be used as a short-range radar. In the case of a short-range radar, the described capability to use the outer edge of the square-wave function to determine the beat frequency or the distance is also particularly advantageous since, in the case of sensors such as these, the shortest distance or the closest object is frequently of particular interest, for example when the sensor is used for collision avoidance purposes. The measurement accuracy problems which normally occur with systems according to the prior art and result from echo superimpositions ideally do not occur with the system according to the invention if, as proposed, the inner edges of the square-wave function are used for evaluation. The problems resulting from superimposition of spectral components in conventional systems and the advantage of the system according to the invention are illustrated clearly in FIG. 11. This shows the superimposition of 6 signal components (1, 2, . . . , 6) illustrating that, in the normal situation (at the top in FIG. 11), the specific measurement value, that is to say the maximum of the spectrum, does not correspond with the actual frequency which is proportional to the distance (in this case=100).

In contrast, in the case of the system according to the invention (at the bottom in FIG. 11), the left-hand edge is located at the correct position even when the signal components are superimposed, that is to say a correct range value is determined.

In order to exactly determine the edges, in particular the first innermost edge, it is advantageous to differentiate the magnitude spectrum, since the steep flanks of the square wave then result in pronounced peaks. The positions of the maxima of the peaks then correspond to the position of the edges or points of inflexion of the edge function. This form of evaluation makes it possible to use simple means to avoid the amplitude of the signal influencing the location of the specific position, as would be the case with simple threshold value evaluations. Since the measurement signals and spectra generally occur only in a time-discrete form, it is also advantageous to further improve the determination of the position of the maxima of the differential spectrum with the aid of an interpolation calculation. An advantageous interpolation process can be carried out, for example, using a conventional polynominal fit. Some of the discrete spectral points in the immediate vicinity of the maximum (for example 3 points, that is to say the maximum and its right-hand and left-hand neighbors) and an even-order polynominal (for example 2nd order, that is to say a parabel) are preferably used for this purpose. It is, of course, likewise possible to use other interpolators, such as spline methods or those methods which match the curve shapes to be expected to the measured curve by means of least-squares methods.

All of the methods mentioned may, of course, also be used individually, or the preferred features according to the invention may be developed in other combinations and may also be combined with other methods which are known for FMCW radars.

We claim:

1. A configuration, comprising:
   a transmission device for transmitting a transmission signal, said transmission device having a transmission oscillator;
   a reception device for receiving a reflection of the transmission signal, said reception device having an evaluation oscillator; and
   wherein said transmission oscillator is configured to be excited quasi-phase coherently by said evaluation oscillator, and/or said evaluation oscillator is configured to be excited quasi-phase coherently by said transmission oscillator.

2. The configuration according to claim 1, wherein the respective said oscillators are connected to one another by a line connection to enable said transmission oscillator to be excited quasi-phase coherently by said evaluation oscillator and/or said evaluation oscillator to be excited quasi-phase coherently by said transmission oscillator.

3. The configuration according to claim 1, wherein the respective said oscillators are disposed adjacent one another to enable said transmission oscillator to be excited quasi-phase coherently by said evaluation oscillator and/or said evaluation oscillator to be excited quasi-phase coherently by said transmission oscillator.

4. The configuration according to claim 1, wherein said oscillators are unshielded from one another, to enable said transmission oscillator to be excited quasi-phase coherently by said evaluation oscillator and/or said evaluation oscillator to be excited quasi-phase coherently by said transmission oscillator.

5. The configuration according to claim 1, which comprises a device for switching the respective said excitable oscillator cyclically at a clock rate.

6. The configuration according to claim 5, wherein a time during which said excitable oscillator can be switched on lies in a same order of magnitude as a reciprocal, or is less than the reciprocal, of a difference between the steady state frequencies of the respective said oscillators.

7. The configuration according to claim 5, wherein a repetition rate of a clock at which the respective said excitable oscillator is switched is considerably higher than a frequency of a measurement signal.

8. The configuration according to claim 7, wherein the repetition rate of the clock is more than five times higher than the frequency of the measurement signal.

9. The configuration according to claim 1, wherein at least one of said transmission oscillator and said evaluation oscillator have a variable frequency.

10. The configuration according to claim 1, wherein one of said transmission oscillator and said evaluation oscillator is a variable-frequency oscillator, while one of said evaluation oscillator and said transmission oscillator is a fixed-frequency oscillator.

11. In a distance measurement system, the configuration according to claim 1.

12. The configuration according to claim 1, wherein said transmission device is a radar transmitter and said reception device is a radar receiver.

13. The configuration according to claim 12, wherein said radar has a tunable frequency range and/or said radar is switchable to two switching states between a short-range radar and a long-range radar.

14. A vehicle, a building or an industrial plant having a configuration according to claim 1.

15. A method, which comprises:
   exciting a transmission oscillator quasi-phase coherently with an evaluation oscillator and/or exciting an evaluation oscillator quasi-phase coherently with a transmission oscillator;
   generating a transmission signal with a transmission oscillator;
   transmitting the transmission signal;
   receiving a reflection of the transmission signal; and
   generating an evaluation signal with an evaluation oscillator.

16. The method according to claim 15, which comprises performing the method steps for distance measurement.

17. The method according to claim 15, which comprises mixing the evaluation signal with the reflection of the transmission signal.

18. The method according to claim 15, which comprises performing one or both of the following two steps:

exciting the transmission oscillator quasi-phase coherently repeatedly and cyclically with the evaluation oscillator;

exciting the evaluation oscillator quasi-phase coherently, repeatedly and cyclically with the transmission oscillator.

* * * * *